April 9, 1946.  A. JENSEN  2,398,313

HYDRAULIC TRANSMISSION

Filed May 15, 1942   3 Sheets-Sheet 1

INVENTOR
AAGE JENSEN
BY
Wheeler, Wheeler & Wheeler
ATTORNEYS.

April 9, 1946. A. JENSEN 2,398,313
HYDRAULIC TRANSMISSION
Filed May 15, 1942 3 Sheets-Sheet 2
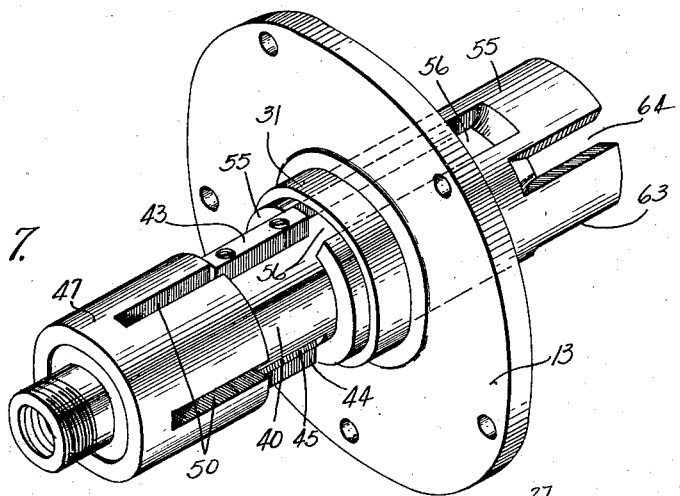
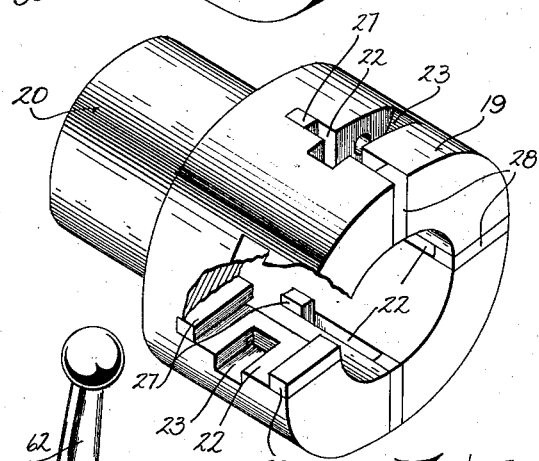
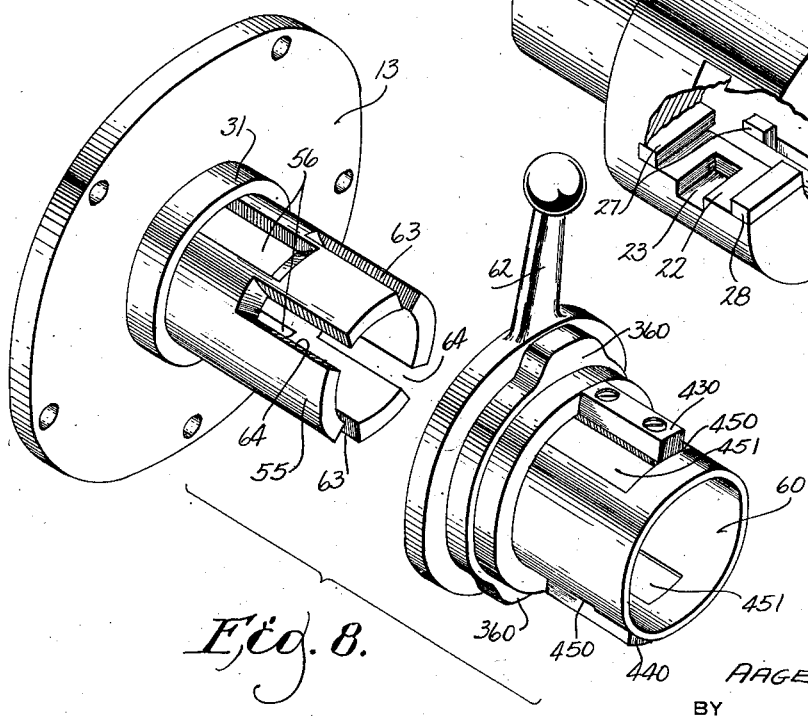
INVENTOR
AAGE JENSEN
BY
Wheeler, Wheeler & Wheeler
ATTORNEYS.

April 9, 1946.   A. JENSEN   2,398,313
HYDRAULIC TRANSMISSION
Filed May 15, 1942   3 Sheets-Sheet 3
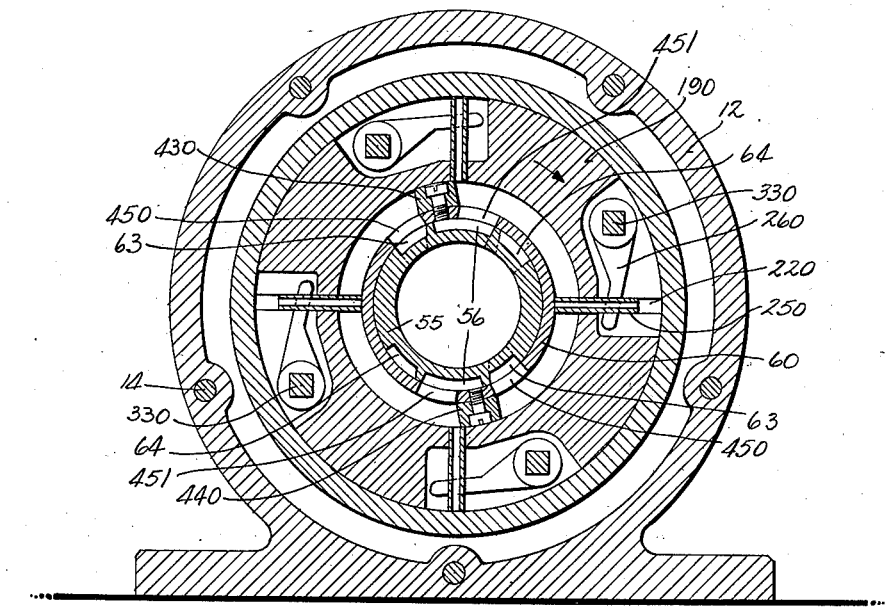
Fig. 4.
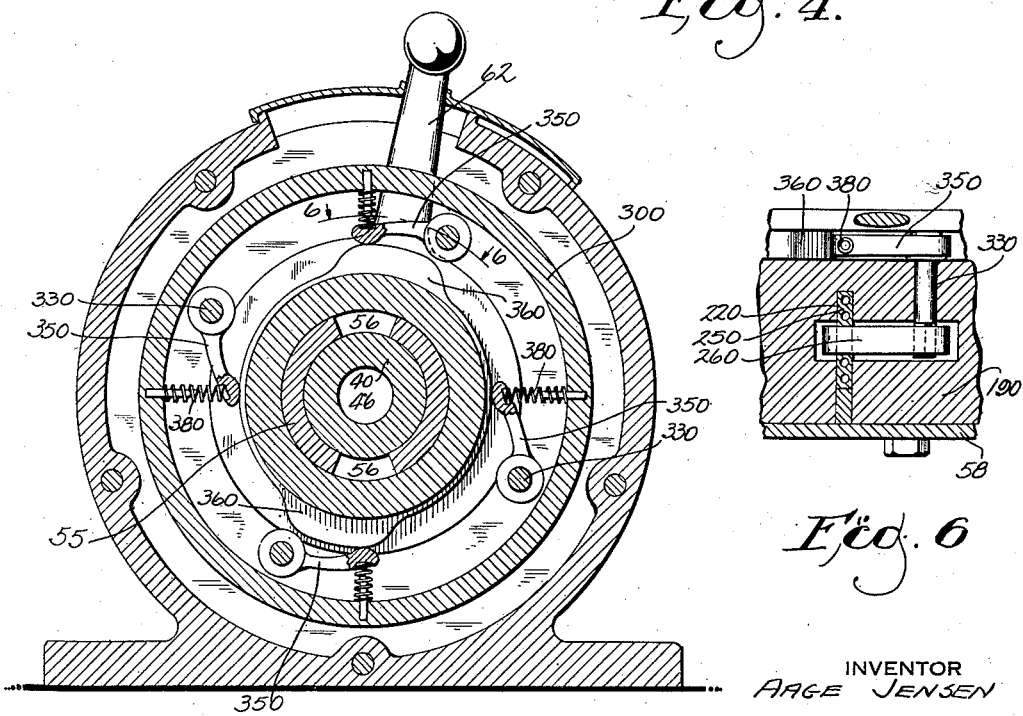
Fig. 5.
Fig. 6.
INVENTOR
AAGE JENSEN
BY
Wheeler, Wheeler & Wheeler
ATTORNEYS.

Patented Apr. 9, 1946

2,398,313

UNITED STATES PATENT OFFICE 2,398,313

HYDRAULIC TRANSMISSION

Aage Jensen, Racine, Wis.

Application May 15, 1942, Serial No. 443,053

14 Claims. (Cl. 60—53)

This invention relates to improvements in hydraulic transmissions.

It is, broadly, the primary object of the invention to provide a novel and improved hydraulic transmission which is particularly compactly organized and which provides in one compact unit for variation in the relative speed and power of motion transmission and also for the reversal of the direction of operation of the motor.

More specifically, the invention seeks to provide an improved and compact organization of a pump and motor within a case, with particular reference to a new and improved disposition of the liquid pressure and return passages.

Other specific objects of the invention pertain to the improvement of the pump and motor devices which comprise a part of the transmission with a view to adapting them for use in the apparatus generally and, moreover, with a view to incorporating the reversing feature directly into the displacement unit at one end of the device. The displacement unit in question will ordinarily function as a motor but is capable of use either as a pump or motor, as is obvious to one skilled in the art.

Other objects of the invention will be apparent to skilled persons examining the following disclosures.

Fig. 3 is a view in perspective of a part of the rotor shown in Fig. 2.

Fig. 4 is a view in section taken on line 4—4 of Fig. 1.

Fig. 5 is a view in section taken on line 5—5 of Fig. 1.

Fig. 6 is a fragmentary detail view taken in section on line 6—6 of Fig. 5.

Fig. 7 is a view in perspective of the associated stator parts which are illustrated above in Fig. 2 and in Fig. 5.

Fig. 8 is a view in perspective of partially disassembled stator parts shown in Fig. 4, one of such parts comprising the adjustable reversing sleeve.

Like parts are identified by the same reference characters throughout the several views.

Figure 1:
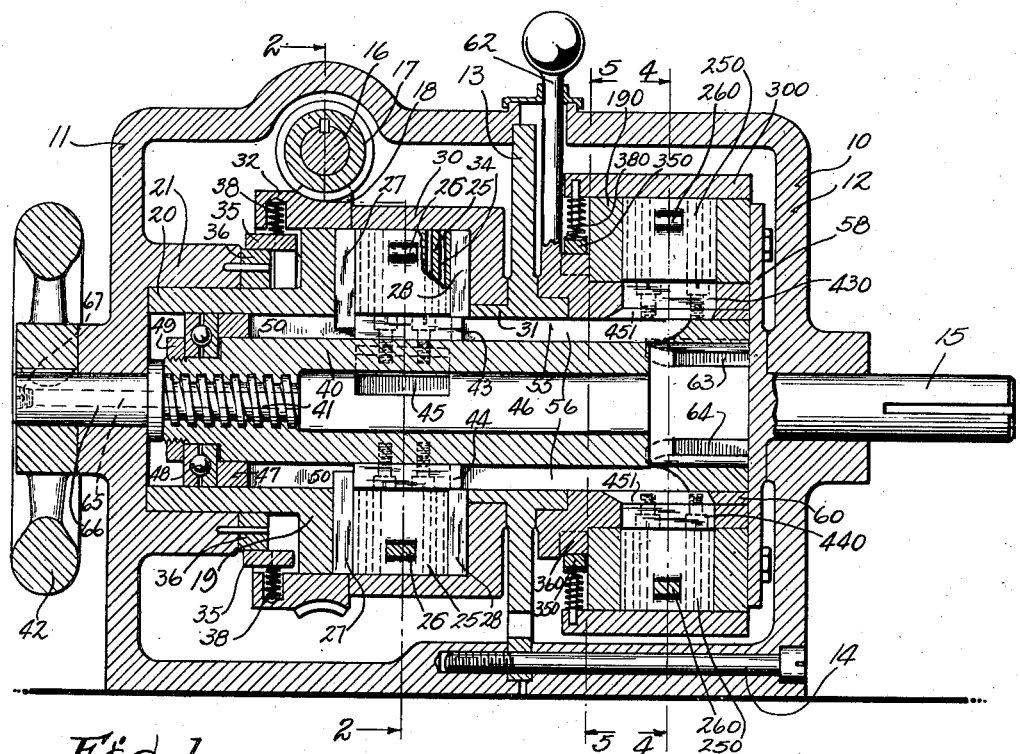
Fig. 1 is a view in axial section through a transmission embodying the invention.

While the transmission as such will function equally well when power is applied to either end, the present disclosure assumes that the power is transmitted through the apparatus from its left hand end to its right hand end and with that in mind I have regarded the displacement device at the left hand end of the structure (as viewed in Fig. 1) as a pump and have illustrated a worm and worm gear power input. It will be understood that any other suitable motion transmitting connections may be employed.

The mechanism as a whole is compactly assembled in a transmission case 10 which may comprise two cup-shaped sections 11 and 12 clamped together upon intervening partitions 13 by bolts 14. The shaft 15, here assumed, for purposes of illustration, to be the driven shaft, projects axially from the casing section 12. The shaft 16, illustratively assumed to be the driving shaft, enters the side of the casing section 11 and carries a worm 17 meshing with a worm gear 18. The use of speed reducing gearing is no part of the invention.

The respective displacement devices which comprise the pump and motor are similar rotary engines of a generally well known type but they differ from each other specifically in order to provide reversible duct connections and variable power output within the compact dimensions of the case 10 as will hereinafter be described.

The body of the rotary engine which, in the present device, constitutes the pump, is shown in perspective in Fig. 3. It comprises the annular rotor 19, from one end of which projects the reduced diameter bearing sleeve 20. This bearing sleeve is rotatable in a bearing surface provided interiorly by the annular boss 21 on the casing section 11.

Figure 2:
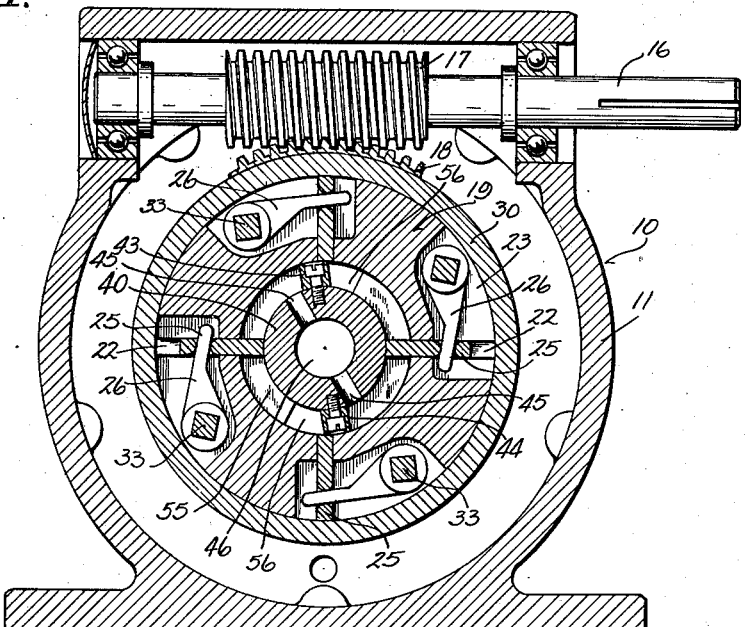
Fig. 2 is a view taken in section taken substantially in the line 2—2 of Fig. 1.

The rotor body 19 has slots 22 for radially reciprocable pistons 25 (Fig. 1 and Fig. 2). Intersecting each such slot 22 is a chamber 23 for the rocker arm 26 by means of which the piston is reciprocated. The piston is guided at one side by a key 27 and at the other side by an insert 28 which closes the end of the slot.

To close the piston guideways about the periphery of rotor 19 ( for convenience of manufacture) the annulus 30 is pressed onto the rotor body 19 engaging the closure inserts 28 to hold them in the slots. Annulus 30 provides a bearing for the rotor upon sleeve 31 which is carried by the partition 13 at the center of the casing.

Pressed onto the rotor 19 from its other end is another annulus 32 which carries the worm gear 18. This arrangement is also for convenience of manufacture, since it would be relatively difficult to harden the teeth of the worm gear 18 if these were formed upon a one piece rotor.

Journaled in the rotor body 19 to extend parallel to the axis thereof are the rock shafts 33, the ends of which are squared to take the rocker arms 26 as shown in Fig. 2. Each of the rocker arms engages in an opening in its associated piston 25 so that the oscillation of the rock shaft 33 will be communicated to move the piston radially in its slot 22. Each piston is preferably provided with one or more radial bores 34 (Fig. 1) so that as the piston moves radially in its slot it will not trap liquid above or below the piston but will move freely.

At their outer ends the respective rock shafts 33 are provided with cam follower levers 35 which appear in cross section in Fig. 1 and which bear upon a cam 36 carried by the annular flange 21 of casing section 11. The form of the rock shafts and the cam follower levers does not clearly appear in Fig. 1 or Fig. 2 but a corresponding and substantially identical structure is shown in Figs. 5 and 6 in connection with the driven member of the transmission which will hereinafter be described. Compression spring 38 hold the levers 35 to the cam 36 and are responsible for moving the levers, the rock shafts and the pistons in one direction, the cam moving these parts in the opposite direction against the bias of their respective springs 38.

The inner periphery of the rotor body 19 constitutes one cylinder wall. The opposing cylinder wall is provided by the outer periphery of a tubular member 40 which is threaded at its left hand end (Fig. 1) to the screw 41 which projects from the casing section 11 and is provided with a hand wheel 42 for its rotation. By means of the hand wheel and screw the tube 40 may be moved axially of the casing but it is nonrotatable. As shown above in Fig. 1 and Fig. 7, the tube 40 carries on its outer periphery the non-rotatable abutments 43 and 44 which constitute the cylinder heads. At one side of each of these cylinder heads is a slot 45 (Fig. 7) opening radially through the tube 40 from the interior thereof, the interior passage 46 through the tube 40 constituting a low pressure conduit for liquid supplied to the pumping engine.

The location of the cylinder head abutments 43 and 44 on the periphery of tube 40 corresponds to the peripheral location at which the cam 36 elevates the pistons 25. As is usual in such devices, the form of the cam causes the pistons to move radially outwardly in their slots to clear the stationary abutments or cylinder head 43 and 44 after which, in the rotation of the rotor, the pistons are returned into engagement with the periphery of the tube 40.

A displacement sleeve 47 (Fig. 1 and Fig. 7) is constrained by the thrust bearing assembly 48 and the retaining nut 49 (Fig. 1) to move axially with the tube 40 subject to the control of screw 41 and hand wheel 42. The displacement sleeve 47 is required, however, to rotate with the rotor body 19 by reason of the fact that it has slots at 50 in which the keys 27, previously identified, are engaged.

Fixed within the annular bearing flange 31 of partition 13 is a stationary sleeve 55, best shown in Figs. 1, 7 and 8. This sleeve is provided at 56 with axially extending slots providing high pressure passages opening from the pumping engine just described to carry liquid from the pumping engine through the partition 13 to the motor hereinafter to be described. The slots 56 not only carry high pressure liquid but serve to receive the cylinder head abutments 43 and 44 when these are displaced axially by movement of the tube 40 upon which they are mounted. Engagement of these abutments with the side of the slots 56 holds the tube 40 against rotation. The operation of the pumping engine may now be summarized.

Liquid is received from the interior passages 46 of tube 40 through the ports 45 into the annular cylinder space between the outer periphery of the tubes 40 and the inner periphery of the rotor bodies 19. Fig. 2 shows the pistons which are there illustrated at the top and bottom of the view, elevated to clear the stationary cylinder head abutments 43 and 44 while the pistons which are horizontally illustrated in Fig. 2 are wiping the surface of the non-rotatable tube 40. Ahead of each of these acting pistons 25 liquid is being displaced and discharged into the high pressure passage afforded by the slot 56 of the stationary sleeve 55. Behind each of the acting pistons 25 a fresh supply of liquid is being drawn into the annular cylinder space.

When the tube 40 is moved axially by the screw 41 and hand wheel 42, the cylinder head abutments 43 travel into the high pressure discharge passage slots 56 of the stationary sleeve 55 and the annular cylinder space between the inner periphery of the rotor 19 and the outer periphery of the tube 40 is thereupon filled to a greater or lesser degree by the sleeve 47. The keys 27 maintain the slots 50 of sleeve 47 in registry with the rotor slots 22 in which the pistons 25 reciprocate, so that each piston will continue its cam controlled reciprocation into the slots 50 of the displacement sleeve 47. Thus the operation of the parts will continue unimpeded but the effect of the pistons in displacing liquids about the annular cylinder space will be reduced by the displacement capacity of sleeve 47 which has invaded such space.

Pumping engines of this type being known as to their general characteristics, it is believed that no further description of operation is necessary. Accordingly, the motor will now be described, with particular reference to high and low pressure communication with the pumping engine through the reversing mechanism.

The cylinder space of the motor engine is of somewhat greater diameter than that of the pumping engine in order to accommodate the reversing mechanism and the communicating passage. Otherwise the construction is quite similar. There is a rotor body 190 having radial slots at 220 in which the pistons 250 are radially reciprocable under the control of rocker arms 260 on rock shafts 330 which are journaled in the rotor body 190 and provided at their outer ends with levers 350 bearing on the cam 360 and held thereto by compression springs 380 which seat against the ring 300 which is pressed onto the outside of the rotor body to close the ends of the slots in which the pistons reciprocate. The driven shaft 15 has a flange 58 which is bolted to the body.

Journaled on the outside of the stationary sleeve 55 is an oscillatory reverse control sleeve 60 (Figs. 1, 4 and 8). This sleeve carries the cylinder head abutments 430 and 440 of the motor engine and it also carries the cam 360 and is provided with a lever 62 projecting from the casing 10 and constituting a means for oscillating the control sleeve 60 upon the stationary sleeve 55.

Whereas the pumping engine has but a single slot adjacent each of the abutments 43 and 44, the motor engine has two such slots at 450 and 451 respectively, one being located at each side of each of the abutments. The underlying fixed sleeve 55 has slots at 63 and 64 which are more widely spaced than slots 450 and 451 in a peripheral direction, this best being illustrated in Fig. 4 where the spacing between the slots is immediately apparent. The slots 63 and 64 of the stationary sleeve open to the interior of the sleeve and hence communicate with the return passage 46 which extends axially through the tube 40 from the open end of such tube.

With the parts in the position illustrated in the drawings, with particular reference to Figs. 4 and 5, it will be apparent that the high pressure liquid supplied through slots 56 of the stationary sleeve 55 will pass radially outwardly at one side of the stationary abutments 430 and 440 through the slots 451 in the oscillatable reversing sleeve 60 into the annular cylinder space of the motor engine between the outer periphery of the reversing sleeve 60 and the inner periphery of the rotatable body 190. In such space the high pressure liquid will act on the piston vanes 250 which are in contact with sleeve 60 to propel the vanes and the rotor in the direction indicated in Fig. 4 by the arrow. The low pressure liquid ahead of each piston vane will leave the annular cylinder space aforesaid by passing therefrom through one of the discharge slots 450 into one of the underlying discharge slots 63 to the interior of the stationary sleeve 55 and thence back to the return passage 46 to the pumping engine.

If, however, the control lever 62 is moved in a direction which is clockwise in Fig. 4 and counter-clockwise in Fig. 5, the cylinder head abutments 430 and 440 will be shifted correspondingly to the other side of the inlet slots 56, whereupon the slot 450 in the reversing sleeve 60 will register with inlet slot 56 and the slot 451 of the reversing sleeve will register with the outlet slot 64. Thus, 451 will become an outlet and 450 will become an inlet, and the pressure on the vanes and the rotor will be reversed, causing the rotor and the driven shaft 15 to turn in a reverse direction.

It is particularly to be noted that since the abutments 430 and 440 are carried on the reversing sleeve which also carries the cam 360, the necessary relationship between the parts which causes the pistons to be lifted over the cylinder head abutments will be maintained in any adjustment of the sleeve. It is further to be noted that in an intermediate sleeve position the abutments 430 may be centered over the inlet slot 56 in stationary sleeve 55 so that the pressure liquid supplied through slots 56 will pass to both sides of the respective abutments and will immediately leave through the respective slots 450 and 451 and the underlying slots 63 and 64, thereby transmitting no motion to the rotor of the motor engine. Obviously, therefore, the device herein disclosed provides for the operation of the motor engine in forward and reverse directions and for a neutral central position in which no motion of the motor occurs, the necessary controls being incorporated directly in the interior of the motor engine while the controls incorporated in the interior of the pumping engine provide for automatic control of the relative rate of operation of the motor engine from the pump engine.

Those skilled in the art will appreciate that while, for purposes of illustration, one of the engines has been called a pumping engine and the other a motor engine, each is applicable for either function. If the shaft 15 is primarily driven, the engine at the right hand of Fig. 1 will serve as a pump reversible as to output, while the engine at the left of Fig. 1 will serve as a motor variable as to its relative speed respecting the pump (assuming that the gearing connections are either removed or are capable of delivering the power).

The bottom of the case serves as a sump in which any leaking oil is collected, serving to lubricate the moving parts. While the device may be filled in any desired manner in the first instance, I have shown, as a convenient way of introducing or withdrawing oil or other hydraulic fluid, a passage 65 to the control rod portion 66 of the screw 41, such passage being closed at its outer end by a plug closure 67.

I claim:

1. In a hydraulic transmission having a pumping engine and a motor engine co-axially arranged, the combination with means providing a communicating passage between said engines opening axially to a working chamber of one of said engines and radially to a working chamber of the other, and means providing another communicating passage between said engines opening radially to the working chambers of both of said engines, of reversing means for reversing the communications of said passages with the engine to which they both open radially.

2. The combination defined in claim 1 together with means for varying the displacement of the other of said engines.

3. In a hydraulic transmission having a first engine comprising relatively rotatable inner and outer members spaced to provide an annular cylinder, cylinder head means fixed to one of said members, vanes radially reciprocable in the other of said members, means for actuating said vanes radially to clear the cylinder heads in the relative rotation of said members, and means providing a fluid communication passage opening axially from said cylinder space, a second engine including relatively rotatable inner and outer members spaced to provide a cylinder space with which said passage radially communicates, means carried by one of said second engine members providing cylinder heads in said space and radially movable piston vanes carried by the other of said second engine members, said second engine members having relatively movable parts coacting for the radial movement of the piston vanes to clear said heads in the relative rotation of the second engine members, together with means providing a return passage from the cylinder space of the second engine to the cylinder of the first engine.

4. The device of claim 3 in which the inner second engine member is oscillatory between selected positions for forward and reverse and is provided with separate ports for affording communication from said communication passages to the second engine cylinder space at opposite sides of the respective cylinder heads according to the oscillatory position, the shifting of position of the oscillatory member also shifting the relative point in the relative rotation of the second engine members at which the cylinder heads are located and at which the piston vanes are reciprocated to clear said cylinder heads.

5. In a hydraulic transmission, the combination with a casing comprising cup-shaped sections, of a partition member between said sections provided with a central annular flange, a sleeve supported in said flange and provided with at least one slot extending axially of the sleeve through the partition, a tube axially reciprocable in the sleeve and provided with at least one port normally exposed beyond the sleeve, at least one cylinder head abutment member fixed to said tube and disposed in the slot of the sleeve for reciprocation in the slot when the tube is reciprocated respecting the sleeve, the abutment being of less width than the slot whereby to leave a passage opening through the partition, said port and passage constituting fluid inlet and exhaust means, a displacement annulus mounted on the tube for reciprocation therewith and rotatable respecting the tube, an engine body rotatable about the tube and having a portion spaced therefrom to afford a cylinder space within which said abutment member is disposed and provided with radial piston vane slots and means keying said body with said annulus, the annulus being correspondingly slotted, piston vanes reciprocable in the slots into said space, means comprising a relatively fixed part and a part relatively rotatable with said body having cam surfaces interacting in at least one direction for the reciprocation of said vanes to clear the abutment of said tube in the course of relative rotation between said body and tube, and means for the axial reciprocation of said tube to advance said annulus between said body and tube in an axial direction, the slots of the annulus accommodating the reciprocation of the pistons, whereby to vary the liquid displacement capacity of the cylinder space between the body and tube.

6. In a transmission having a pump as set forth in claim 5, the combination with a control sleeve at the other side of the partition oscillatably mounted externally of the sleeve first mentioned and provided with ports selectively registerable with the slot of the sleeve first mentioned according to the position of oscillation of the control sleeve, said first sleeve also having ports with which the ports of the control sleeve are alternatively registerable, of a cylinder head abutment mounted on the control sleeve between its aforesaid ports, an engine body mounted for rotation about the control sleeve in spaced relation thereto to provide a cylinder space in which said last mentioned abutment is disposed, said body having radial piston vane slots, piston vanes in the slots of the last mentioned body, and cam means reciprocatively carried by the control sleeve and the body for interaction in the course of relative rotation of the body respecting the control sleeve, the cam means carried by the body being connected with the respective piston vanes for the reciprocation thereof in the course of such relative rotation to enable the piston vanes to clear the cylinder head abutment last mentioned, and the cam means carried by said body being movable therewith in the oscillatory adjustment of the body whereby to vary the location of the abutment when the relative positions of the ports are varied and to effect a corresponding change of the relative point at which the piston vanes are reciprocated to clear such an abutment, the ports of the first sleeve with which the ports of the control sleeve alternatively register, as aforesaid, communicating through the first sleeve with the interior of said tube and thence with the cylinder space first mentioned.

7. In a hydraulic transmission comprising a case and coaxial pump and motor engines, one of which is variable only as to displacement and the other only as to direction of operation, the improvement which consists in the combination of an axially movable tube disposed centrally in the case and provided with one open end and with a plurality of radial ports intermediate its ends, said case being provided with means for the axial adjustment of said tube, fixed cylinder head abutments carried by the tube adjacent the respective ports, a displacement annulus rotatably mounted on the tube and arranged for axial adjustment therewith, said annulus being provided with axially extending slots, a rotor encircling the tube and spaced therefrom to provide a cylinder space in which said abutments are disposed, said rotor comprising a body radially slotted in registry with the slots of the displacement annulus, means keying the displacement annulus for rotation with said body, piston vanes reciprocable in the slots of said body and adapted to enter the slots of the displacement annulus when the displacement annulus is moved with said tube into the cylinder space of the body, cam means operable in the course of relative rotation between the body and the tube for the reciprocation of the piston vanes to clear the respective abutments, a sleeve extending axially of the tube to said cylinder space and providing axial slots with corresponding sides of which the respective abutments of said tube are engaged and into which said abutments are movable upon the reciprocation of said tube, means supporting the slotted sleeve, and ports extending radially through the slotted sleeve at either side of the slots first mentioned and communicating at the interior of the sleeve with the open end of the tube, the engine which comprises reversing means including a control sleeve mounted for oscillatory adjustment upon the sleeve first mentioned and provided with ports alternatively adjustable in the oscillation of the control sleeve for registration with the slot of the sleeve first mentioned, a port of the control sleeve out of registry with said slot being registered with one of the aforesaid ports of the sleeve first mentioned, fixed cylinder head abutments carried by the control sleeve between its respective pairs of ports, a rotor comprising a body rotatable about the control sleeve and spaced therefrom to provide a cylinder space in which said abutments last mentioned are disposed, said body having radial piston vane slots, piston vanes reciprocable in the respective slots, and cam means carried in part by the control sleeve and in part by said body, the part carried by the body having connections to the respective piston vanes for the reciprocation thereof to clear the respective cylinder head abutments last mentioned, a shaft connected with said body, and means for the oscillation of the control sleeve.

8. In a hydraulic transmission including a case and coaxial pump and motor engines, one of which is variable only as to displacement and the other only as to direction of hydraulic flow therethrough, the improvement which comprises the combination of a shaft projecting from one end of the case and an adjusting rod projecting from the other, the engine which comprises displacement varying means being located in the other case end and including an annular boss about the rod, a cam carried by the boss, an engine rotor having a portion journaled within the boss, a displacement annulus rotatable and reciprocable within said portion, a tube mounted for reciprocation and connected with said rod to be controlled thereby, said annulus being rotatable upon the tube but connected for reciprocation therewith and provided with axial slots, a body connected with the rotor and radially slotted in registry with the slots of the annulus, means keying the annulus for rotation with the body, motion transmitting connections for said rotor, piston vanes reciprocable in the slots of the body and the slots of the annulus when the annulus is moved axially within the body, cam follower means connected with the rotor and coacting with said cam and operatively connected for the reciprocation of the piston vanes in said body, said body being spaced from said tube to provide an annular cylinder into which said annulus is axially movable for displacement to reduce cylinder capacity, cylinder head abutments fixed to said tube and positioned to be cleared by the piston vanes in their cam controlled reciprocation, said tube being ported adjacent the respective abutments to afford communication between the interior of the tube and the aforesaid cylinder space, the case having a partition and the engine which comprises reversing means including, a sleeve supported by the partition and provided with a bearing for the tube and with axially extending slots in which the ends of the respective abutments are disposed and in which said abutments are longitudinally movable in the reciprocation of the tube respecting said sleeve, said slots having sufficient width to provide fluid passages beside the respective abutments opening into communication with the cylinder space aforesaid, said slots extending past the partition and the said sleeve having beyond said partition pairs of ports, the ports of each pair being disposed at opposite sides of one of said slots and communicating through said sleeve with the open end of said tube, a control sleeve mounted for oscillatory adjustment on the outside of the sleeve first mentioned and provided with cylinder head abutments for the second engine and with ports in pairs at each side of the respective abutments so positioned that each of said ports may be registered with one of said slots for communication with the cylinder space of the engine first mentioned, the other slot of each pair being alternatively registerable with one of the ports of the sleeve first mentioned, whereby to communicate therethrough and to said tube with the cylinder space of the engine first mentioned, a second engine rotor rotatable upon the adjustable control sleeve and including a body having radial slots and providing an annular cylinder space in which the control sleeve abutments are located, vane pistons radially reciprocable in the several slots, a cam mounted on the control sleeve, cam follower means carried by the second engine rotor and operatively connected with the respective pistons to reciprocate said pistons to clear the control sleeve abutments in the course of relative rotation between the second engine rotor and the control sleeve, and an exterior handle in operative connection with said control sleeve for the oscillation thereof whereby to reverse the flow through the cylinder space of said second engine, the second engine rotor being connected with the aforesaid shaft.

9. In a device of the character described, an engine which comprises a first sleeve having at least one series of three ports for pressure and exhaust connections, the center port in the series comprising one of said connections and the two external ports of the series comprising the other of said connections, a control sleeve rotatable upon the sleeve first mentioned and having at least one series of two ports in spaced relation, each of said control sleeve ports being registerable alternatively with the central port of the first mentioned sleeve, the other control port, in each instance, registering with one of the end ports of the series of ports of the control sleeve, means for oscillating said control sleeve between positions in which its respective ports register with the central port of the control sleeve series, a cylinder head abutment member carried by the control sleeve between its ports, and an engine rotor including vane pistons and means for the reciprocation thereof rotatable about the control sleeve.

10. The structure defined in claim 9 in which the rotor is spaced from the control sleeve to provide an annular cylinder in which said abutment is disposed and is provided with radial guideways opening from said cylinder space, in which said vane pistons are reciprocable, said control sleeve having a cam comprising the means for reciprocation aforesaid and said rotor being provided with a series of cam followers connected with the respective pistons and operatively engaging the cam for radially moving said pistons to clear said abutment, said cam and abutment being adjustable with the control sleeve in the movement of the sleeve between its aforesaid positions.

11. The structure defined in claim 9 in which the rotor is spaced from the control sleeve to provide an annular cylinder in which said abutment is disposed and is provided with radial guideways opening from said cylinder space, in which said vane pistons are reciprocable, said control sleeve having a cam comprising the means for reciprocation aforesaid and said rotor being provided with a series of cam followers connected with the respective pistons and operatively engaging the cam for radially moving said pistons to clear said abutment, said cam and abutment being adjustable with the control sleeve in the movement of the sleeve between its aforesaid positions, the piston guide slots being closed at their outer ends and the several pistons being provided with radial passages for the relief of pressures between the pistons and the ends of their respective slots.

12. The structure defined in claim 9 in which the rotor is spaced from the control sleeve to provide an annular cylinder in which said abutment is disposed and is provided with radial guideways opening from said cylinder space, in which said vane pistons are reciprocable, said control sleeve having a cam comprising the means for reciprocation aforesaid and said rotor being provided with a series of cam followers connected with the respective pistons and operatively engaging the cam for radially moving said pistons to clear said abutment, said cam and abutment being adjustable with the control sleeve in the movement of the sleeve between its aforesaid positions, the pistons having central apertures and the respective cam followers being mounted on rock shafts having arms engaged in the piston apertures for the radially outward reciprocation thereof, said rotor being provided with spring means biasing the pistons in opposition to the arm induced movement thereof, whereby to maintain said pistons normally in contact with the surface of the control sleeve.

13. In a hydraulic transmission comprising coaxially arranged pump and motor engines, each of which includes inner and outer members providing an intervening chamber and vanes mounted in the outer member and reciprocable to and from the inner member, the combination of a tube constituting the inner member of one of said engines and provided with radial slot means affording communication between the interior of the tube and the chamber of such engine and with a sleeve upon the tube having axially extending passage means opening axially from the chamber space of the engine with which said slot means communicates, and a second sleeve constituting the inner member of the other engine, such second sleeve being oscillatory upon the first sleeve and having slot means selectively registerable with the passage means of the first sleeve and with a slot means with which such first sleeve is provided and which affords communication with the interior of such tube, whereby means for controlling direction of hydraulic flow into the chamber space of the second engine is provided by the inner member constituting a part of such engine.

14. The transmission as set forth in claim 13, in which the tube is axially movable with respect to the engine first mentioned and comprises means for varying the chamber capacity of the engine first mentioned in the course of its axial movement.

AAGE JENSEN.